June 11, 1968  W. E. FISCHER  3,387,814
COMPONENT MOUNTING CLAMP
Filed Oct. 27, 1966
FIG. 1
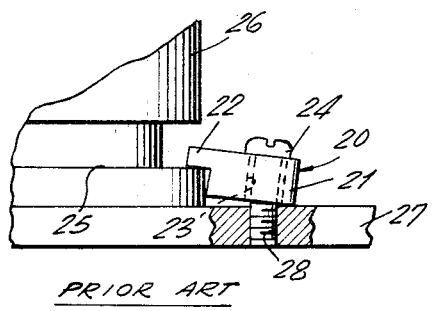
PRIOR ART
FIG. 2
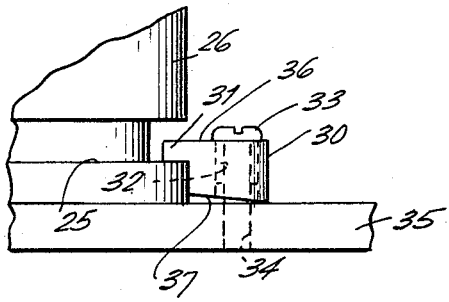
FIG. 3
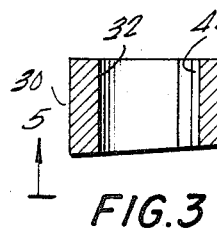
FIG. 4
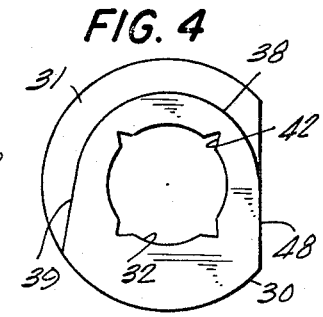
FIG. 5
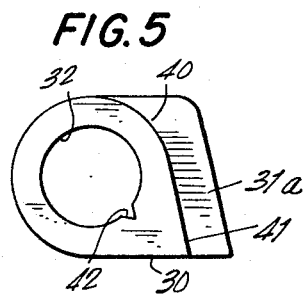
FIG. 6
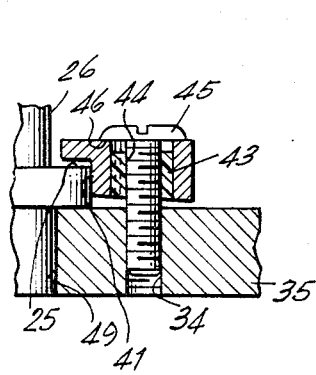
FIG. 7
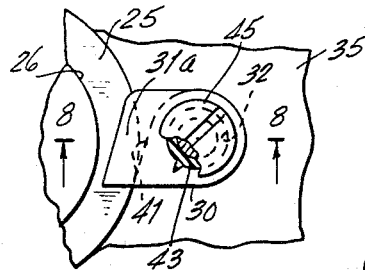
FIG. 8
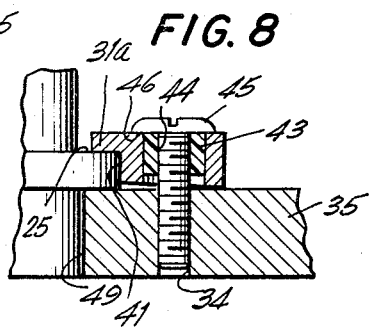
FIG. 10
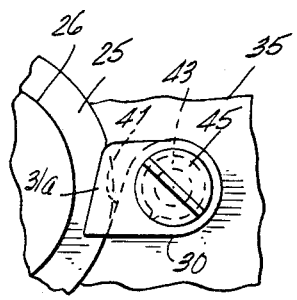
FIG. 9
INVENTOR.
WILBUR E. FISCHER
BY Albert H. Kornman
ATTORNEY

United States Patent Office 3,387,814
Patented June 11, 1968

3,387,814
COMPONENT MOUNTING CLAMP
Wilbur E. Fischer, 199 N. Main St.,
Freeport, N.Y. 11520
Filed Oct. 27, 1966, Ser. No. 589,870
4 Claims. (Cl. 248—361)

ABSTRACT OF THE DISCLOSURE

A clamp for securing components having a flanged base to a support having internally threaded bores said clamp having a non-circular cam shaped body portion and an outwardly extending lip at the top thereof for engaging the upper surface of the flange. A central bore in the body portion carries a plastic insert through which a screw member is threaded. Rotation of the clamp as the screw member is threaded into the support bore brings the lobe of the cam into lateral contact with the flange of the base bringing the lip into clamping orientation. The bottom of the body portion is skewed to improve clamp life and holding performance.

This invention relates to clamps or hold-downs for securing mechanical and electrical instrument components to a support.

It is well known to fasten mechanical and electrical instrument components to a support by providing a flanged portion on the component and using a hold-down or clamp which overlies the flange and is secured to the support structure. However, such devices often fail under conditions of vibration, high-temperature, or shock. In addition, prior art devices were difficult to install particularly where the available space for tool operation was extremely limited. Excessive tightening of prior art devices, in an effort to insure against failure, often resulted in the destruction of the clamp before it could be placed into operation.

Accordingly, it is an object of the present invention to provide a clamp for securing components to a support which will overcome one or more of the shortcomings of the prior art devices.

Another object of the present invention is to provide a clamp which is easy to install in a small space.

Another object of the present invention is to provide a clamp capable of tight engagement with a component without danger of clamp destruction.

Still another object of the present invention is to provide a clamp which will withstand high-temperatures and vibration and maintain its hold.

A feature of the present invention is its use of a tapered portion on the bottom of the clamp to improve the clamp's gripping properties.

Another feature of the present invention is its unique plastic insert for receiving the tightening screw of the clamp, and contributing to the vibration resistant properties of the assembly.

Still another feature of the present invention is its clamp-body configuration whereby bending movements are not imparted to the fastening screw despite differences in flange tolerances of the components to be secured.

The invention consists of the construction, combination and arrangement of parts, as herein illustrated, described and claimed.

In the accompanying drawings, forming a part hereof, there is illustrated two forms of embodiment of the invention, in which drawings similar reference characters designate corresponding parts, and in which:

FIGURE 1 is a view in side elevation of a clamp made in accordance with the prior art.

FIGURE 2 is a view in side elevation similar to FIGURE 1, showing a clamp according to the present invention.

FIGURE 3 is a view in vertical section somewhat enlarged of the clamp body shown in FIGURE 2.

FIGURE 4 is a bottom plan view of the FIGURE 2 clamp body made in accordance with the present invention.

FIGURE 5 is a bottom plan view of a further form of clamp body.

FIGURE 6 is a side elevational view partly in section showing the clamp of FIGURE 2 during an early stage in its application to the flange of a component and a securing base.

FIGURE 7 is a top plan view of the clamp shown in FIGURE 5 partially broken away.

FIGURE 8 is a cross-sectional view taken on line 8—8 in FIGURE 7, looking in the direction of the arrows.

FIGURE 9 is a top plan view showing the installed clamp made in accordance with the present invention with certain features indicated by dashed lines.

FIGURE 10 is a view similar to FIGURE 9 showing the installed clamp illustrated in FIGURE 4.

SUMMARY OF THE INVENTION

The invention contemplates the provision of a clamp having a tapered bottom surface on the body portion and an extending clamping lip for engaging the component flange. A screw member is threadably received within a plastic insert carried by the body portion and the body portion is formed with a camming surface whereby rotation of the body portion is prevented when the clamping lip overlies the flange and the body portion is brought into contact with periphery of the flange. Further tightening of the screw brings the clamping lip down upon the flange of the component and the base of the body portion into line contact with the supporting structure.

DESCRIPTION OF THE INVENTION

Referring to the drawings and particularly to FIGURE 1, there is shown a prior art clamp 20 having a clamp body portion 21, and an extending clamping lip 22. The body portion 21 is centrally bored as indicated at 23 to receive therethrough a screw member 24. The bore 23 is filled with some suitable plastic material such as nylon and internally threaded to receive the screw 24. The lip 22 is adapted to overlie a flanged portion 25 of a mechanical or electrical component 26. The screw 24 is threadably received within a support 27 as indicated at 28 to secure the component 26 to the support 27.

It will be apparent from an examination of FIGURE 1 that as the screw 24 is tightened, the bottom of the body portion 21 is brought into contact with the support 27 and the clamping lip 22 is brought against the flange 25. The effect of this structure shown in FIGURE 1 is to produce a point contact between the lip 22 and the flange 25 and a bending moment upon the shank or screw head of the screw 24. The shortcomings of the clamp shown in FIGURE 1 are amplified where there are tolerance variations in the width of the flange 25. In addition, excessive tightening of the screw 24 may cause it to break-off resulting in the necessity of a time consuming replacement. The point contact of the clamping lip and the flange 25 is unsatisfactory and may loosen in the presence of vibration. Moreover, the nylon within the bore 23 must flow around the thread of the screw as the screw is tightened with the result that the frictional contact between the screw and the nylon may be reduced. This frictional contact is essential in order to give the clamp its high holding properties. In addition the greater torque necessary to cause this flow often results in the destruction of the screw head.

Referring to FIGURE 2, there is shown a clamp made in accordance with the present invention having a body portion 30, a clamping lip 31, and a bore 32 through the body portion 30. The body portion 30 is secured to a support 35 by means of a screw member 33 which traverses a bore 32 in the body portion as hereinafter more fully described, and is threadedly received within a threaded bore 34 of the support 35.

The clamping lip 31 is adapted to overlie and engage the flange 25 of the component 26. In the present invention, however, the top surface 36 of the clamp body portion 30 and the bottom surface 37 of the body portion are not parallel. The bottom portion 37 is skewed so as to present a slanting surface to the support 35. As shown in FIGURE 2, the slanting surface 37 is oriented in a manner such that it slants downwardly from the clamping lip side of the body 30, in the direction of the opposite side of the said body portion. The angle made by the slanting bottom surface 37 is such that it is greater than the worst possible accumulation of tolerances to be expected in the size of the flange 25. Accordingly, when the clamp is in its installed position as shown in FIGURE 2, the top surface 36 of the clamp will be substantially parallel with the surface of the support 35 and the clamping lip 31 will provide a line-to-line contact with the upper surface of the flange 25. The bottom of the clamp where the skewed surface 37 meets the support 35 will also provide a line-to-line contact. The leveling of the top of the clamp body 30 eliminates the bending of the screw or screw head such as would result in the prior art structure shown in FIGURE 1. The body portion 30 of the clamp is non-circular or cam-shaped as best shown in FIGURES 4 and 5. In FIGURE 4 the shape of the cam 38 is such that the body portion 30 will make a rotation of 180° before the stop 39 comes to bear against the flange 25. Thereafter, further tightening of the screw 33 will move the body portion 30 downwardly in a vertical path while maintaining the clamping lip 31 so that it overlies the flange 25 and will finally come into gripping contact with it.

In the embodiment shown in FIGURE 5, the cammed surface 40 will only permit the body portion 30 to rotate through an angle of 90° before coming into contact with the stop 41. In this embodiment, the clamping lip 31a also extends outwardly of the body portion 30 to overlie the flange 25 when the stop portion 41 has been put into contact with the said flange.

It will be noted from an examination of FIGURES 4–8, that the body portion 30 is centrally bored at 32 and provided with vertical grooves 42. A sleeve-like plastic insert 43, best shown in FIGURES 6 and 8, is placed within the bore 32 and invades the grooves 42 when the screw 33 is self-threaded into the insert, so that it cannot rotate within the body portion 30. The plastic insert 43 is of a length somewhat shorter than that of the bore 32 so as to provide a space between the top of the insert 43 and the head 45 of the screw 33 as shown in FIGURE 6. As the clamp is tightened upon the flange 25 and moves from the position shown in FIGURE 6 to that shown in FIGURE 8, the plastic insert 43 will be pulled upwardly into the position shown in FIGURE 8 so that a space will remain between the bottom of the insert and the support 35. By providing the space at the top of the insert 43 when the clamp is initially assembled, the screw 24 can form internal threads in the insert 43 without damaging it or causing the plastic to flow. In this manner, the tight contact between the plastic and the screw threads is maintained after the clamp is installed. The insert 43 will move vertically as the clamp is tightened and will be guided by the grooves 42 which also prevent rotation during the tightening operation.

Since the insert 43 does not flow or change shape during the tightening operation, it is possible to employ not only nylon as the plastic insert material but certain other plastics which can withstand higher temperature such as Delrin, manufactured by E. I. du Pont corporation.

The manner in which the clamp or hold-down hereinabove described is used will become apparent from the foregoing description. With the clamp assembled in the manner shown in FIGURE 6, the screw 33 is threaded into the bore 34 and the entire clamp rotated until the bottom surface 37 comes into contact with the support 35. Thereafter, the clamp is rotated counter clockwise until the flat side 48 of the clamp faces the bore 49 which receives the component 26 as shown in FIGURE 9. Thereafter, the component 26 is inserted into the bore 49 in the support 35 and the clamp rotated to bring the clamping lip 31 over the flange 25. The screw is then given its final tightening. During this final tightening operation the plastic insert will be lifted from the position shown in FIGURE 6 to that shown in FIGURE 8. The clamping lip 31 will move down from the position shown in FIGURE 6 to that shown in FIGURE 8, whereupon a tight grip will be achieved.

The screw head 45 is provided with a flat bearing surface 46 which overlies the bore 32 and rides upon the top surface 36 of the body 30. The insert 43 is thus retained within the bore 32 when the clamp is tightened.

The removal of the component is accomplished by rotating the assembly either 90° or 180° about its axis to swing the clamping lip clear of the flange 25.

From the foregoing it will be seen that there has been provided a clamp for securing mechanical or electronic components to a support member which will give excellent holding properties, be easy to install and remain operative during a long period of vibration or changes in temperature.

Having thus fully described the invention, what is claimed as new and desired to be secured by Letters Patent of the United States, is:

1. A clamp for securing a flanged component to a support comprising in combination a component, a flanged base on said component extending outwardly thereof, a support for said component said support having an internally threaded bore therein, a body portion on the clamp, said body portion including a non-circular eccentric camming lobe with a bore therein, a clamping lip on said body portion extending outwardly thereof in a plane normal to the vertical axis of the body portion, a bottom surface on the body portion skewed with respect to the plane of the clamping lip, a plastic insert in the body portion central bore, a screw member threadably and frictionally received within the inserts and engageable with the threaded bore of the support to bring the lobe of the camming body portion into contact with the side of the flanged base and the clamping lip down upon the said flanged base to secure the component to the support.

2. A device according to claim 1 in which the plastic insert is shorter in length than the central bore of the clamp body portion and initially disposed in spaced relationship from the top surface of the said body portion.

3. A device according to claim 2 in which the plastic insert is provided with a longitudinal bore of a diameter smaller than the screw member into which the screw member is self threaded.

4. A device according to claim 2 in which the body portion central bore is longitudinally grooved and the plastic insert invades the said longitudinal groove whereby rotary motion of the insert with respect to the body portion is prevented as the plastic insert is drawn upwardly through the body portion central bore by the tightening of the screw member.

References Cited

UNITED STATES PATENTS

| | | | |
|---|---|---|---|
| 2,733,492 | 2/1956 | Copell | 24—255 |
| 2,862,040 | 11/1958 | Curran | 287—20 X |
| 2,917,267 | 12/1959 | Riddle. | |
| 3,219,371 | 11/1965 | Danly | 287—20 |

JOHN PETO, *Primary Examiner.*